April 30, 1946. E. LEVIN Re. 22,748
METHOD OF TREATING CEREAL GRAIN GERM
Original Filed Aug. 6, 1936
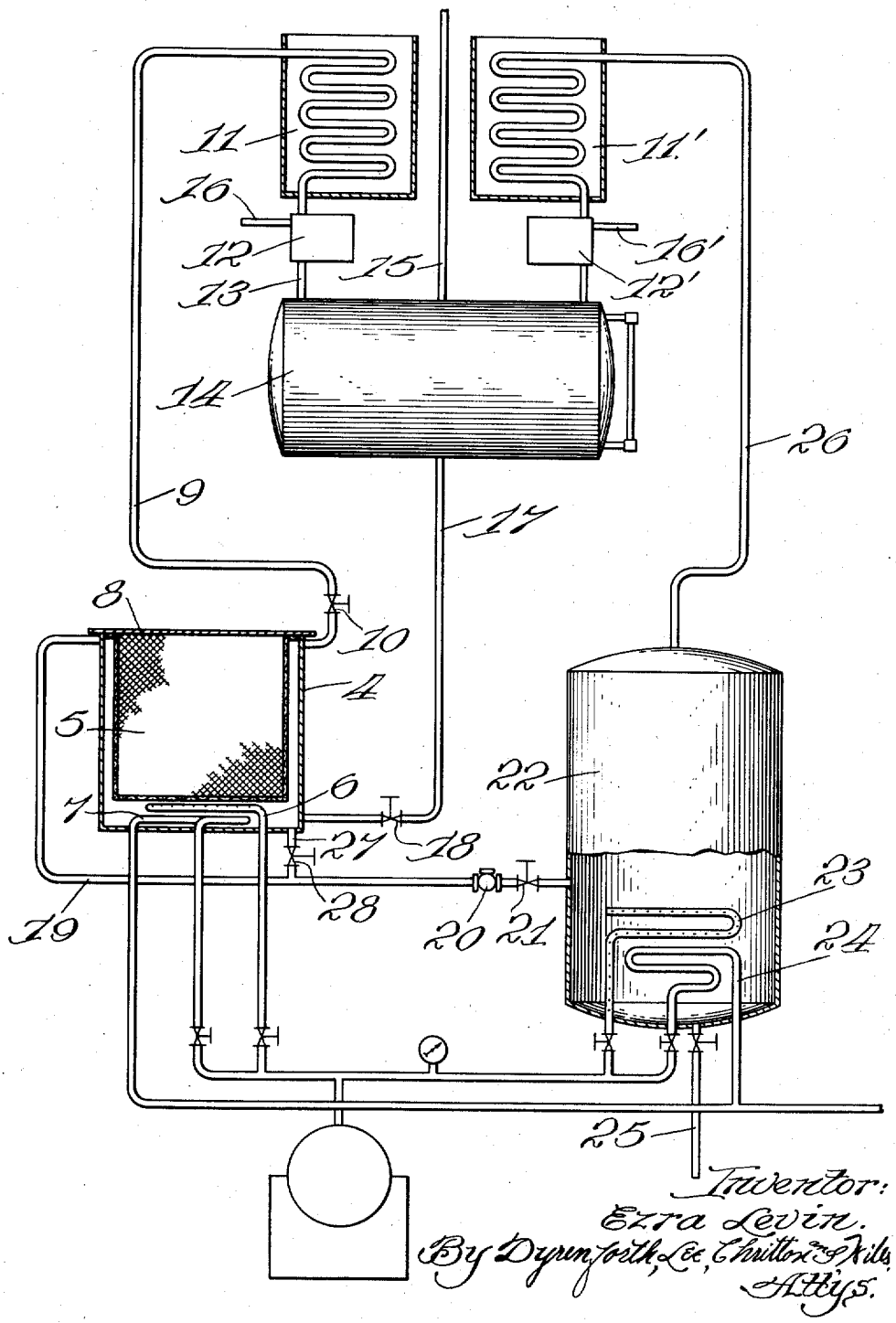
Inventor:
Ezra Levin.
By Dyrenforth, Lee, Chritton & Kile,
Attys.

Reissued Apr. 30, 1946

Re. 22,748

UNITED STATES PATENT OFFICE 22,748

METHOD OF TREATING CEREAL GRAIN GERM

Ezra Levin, Monticello, Ill.

Original No. 2,314,282, dated March 16, 1943, Serial No. 94,709, August 6, 1936. Application for reissue October 27, 1943, Serial No. 507,866

19 Claims. (Cl. 99—80)

This invention relates to a method of preparing anti-neuritic products of edible character, such as foods and medicines, and to the products obtained by such method of treatment.

It is known that the so-called vitamins possess various properties and are intimately concerned with the maintenance of bodily processes, and thus are inseparably connected with the normal physiology of the animal, including man. Thus it is commonly accepted that vitamin A functions to prevent certain types of infections, because its absence from the diet results in inflammation of the eyes, the growth of the animal ceases, and if the condition be not corrected, death usually results; the absence of vitamin C from the diet is likely to result in scurvy and hemorrhages; the absence of the vitamin known as water soluble, growth promoting, anti-neutritic vitamin is likely to result in pellagra and neuritis. The existence of an anti-rachitic factor known as vitamin D, whose function, is to preserve the normal deposition of calcium in the bones, has been shown. Also the existence of vitamin E which is concerned with the maintenance of the function of reproduction, has been shown.

The present invention is particularly concerned with the so-called anti-neuritic vitamin and the reproductive factor known as vitamin E. It has long been known that yeast contains an abundance of the anti-neuritic factor. However, yeast is not well adapted for use in food or as medicine, because of its highly objectionable odor and taste. It is known that the embryo of cereal grains contain the anti-neuritic vitamin $B_1$, or B as it is called in the United States. What was formerly taken to be the water soluble, growth-promoting, anti-neuritic vitamin is not an entity but is composed of at least seven different factors, among which are the anti-neuritic factor and the growth promoting and pellagra preventing factor and the anti-paralytic factor $B_4$ hereinafter described. As yet a uniform terminology for the water soluble vitamin has not been decided upon. British biologists designate the anti-neuritic factor "$B_1$" and the growth promoting factor "$B_2$," reserving "B" to identify the complex of the two factors. In the United States it has been suggested that the term "B" be restricted to designate the anti-neuritic factor and that the term "G" be used to denote the growth promoting factor. In the present application the American terminology will be employed and the term "B" will be restricted to refer to the anti-neuritic factor with which the present invention is concerned.

The anti-neuritic factor is present in the embryo of wheat grain, but it is also present in the germ or embryo of other cereal grains such as barley, rye, corn and oats. Heretofore the anti-neuritic factor in cereal grain germs has been but slightly utilized due to the fact that germs tend to turn rancid on standing. The present invention contemplates treating the various cereal grain germs, and particularly the wheat germ and the corn germ, to render them palatable and preservable, thus making the vitamin "B" readily available for use as a food or medicine. To this end the oil in the cereal grain germs, particularly wheat germ and corn germ, is extracted, leaving a wholesome and preservable product.

Referring again to the cereal grains, it has been shown that vitamin E exists abundantly in the germ oil of these grains, particularly wheat, corn and oats. A further object of the present invention is to remove the oil from these grain germs without damaging the vitamin E content.

A further object is to devise a method whereby cereal grain oil may be removed from the germ without destroying the vitamin B in the new cereal product and to preserve the vitamin E content in the germ oil.

The problem of how to treat cereal grain germs in such manner that the vitamin B content of the germs containing them, such as the germs of wheat, barley, rye, corn and oats, is not destroyed, has been the subject of intensive and careful investigation but no thoroughly satisfactory solution of the problem has heretofore been offered. It has long been thought that the application of heat readily destroys the anti-neuritic factor. I have discovered that by extracting the oil from the grain germ, for example, from the wheat germ and corn germ, in an acid condition the application of heat during the treatment does not impair the vitamin B content of the product and the germ oil extracted may be employed as a source of vitamin E. Moreover, it is possible in this operation to achieve these results without an appreciable solvent loss.

This invention will be readily understood from the following description and the accompanying drawing, which illustrates more or less diagrammatically an arrangement of extractor, vaporizer, condenser, and receiver, which has been found well suited to the practice of the invention.

Referring to the drawing, 4 indicates an extractor supporting a removable foraminous basket 5 adapted to contain the cereal germ to be treated, and open and closed steam coils designated by the numerals 6 and 7, respectively, located below the basket. An agitating device (not shown) may be employed in the extractor if desired. The head 8 is securely fastened to the extractor by bolts or otherwise, in such manner that it may be readily removed.

A vapor pipe 9 provided with a valve 10 leads from the top of the extractor to the upper end of the water-cooled coil of a condenser 11; and from the bottom of the coil leads through a separator 12, a pipe 13 for conducting the condensed solvent to a receiver 14 supported in an elevated position above the extractor when supplied with a vent 15 for releasing uncondensible gases.

At 16 is shown, leading from the top of the separator 12, a valve drain for drawing off the watery product of condensation. From the bottom of the receiver a pipe 17 equipped with a shut-off valve 18 leads to the bottom of the extractor.

From the top of the extractor a pipe 19 provided with a check valve 20 and control valve 21 leads to a vaporizer 22 supported in upright position and having rounded top and bottom. At 23 and 24 are shown, respectively, open and closed steam coils preferably located in the bottom of the still. A draw-off line for the oil is indicated at 25.

The vapor line 26 leads from the top of the vaporizer to the upper end of the water-cooled coil of a condenser 11' which is similar in construction to the condenser 11. In like fashion the lower end of the condenser coil leads into the receiver 14 after passing through the separator 13' equipped with a water drain 16'.

A drain pipe 27, provided with a control valve 28, is tapped into the bottom of the extractor and forms a connection with the pipe 19.

The operation of this apparatus is as follows:

A charge of cereal grain germ, for example, wheat germ or corn germ, from which it is desired to remove a maximum quantity of oil, is placed in the foraminous basket and introduced into the extractor and the head bolted down. The solvent is then allowed to flow from the receiver into the extractor until it is just well below the level of the pipe 19. Steam is turned on in the closed steam coil and the mixture of solvent and grain germ heated. It is desirable to maintain a temperature in the extractor somewhat below the boiling point of the solvent, preferably below 170° F. The oil readily dissolves in the hot solvent and the light solution rises to the top of the extractor and overflows through the line 19 past the check valve 20 into the still. As the oil in solution passes out at the top of the extractor, additional solvent flows in the bottom. Cereal grain germ, exemplified by wheat germ or corn germ, contains varying amounts of water, and a solvent having a specific gravity heavier than water is particularly helpful in displacing water from the germ.

In operation, the still is maintained at temperatures higher than the boiling point of the solvent, and when the solution of solvent and oil enters the still, the solvent is vaporized. The check valve prevents the vapors from back-flowing into the extractor and they rise through pipe 26, are condensed in 11', and flow into the receiver, to be put through the system again. When a maximum amount of oil has been extracted and is completely in solution, the liquid contents of the extractor are withdrawn through the drain 28. The valves are then closed and additional steam applied in the closed steam coil, vaporizing the solvent clinging to the grain germ, returning the solvent to the receiver by means of the pipe, the condenser 11, and the water separator. The last ends of the solvent are completely removed from the grain by a blast of live steam which completely vaporizes the occluded solvent and whatever water may remain in the extractor. The water is separated and withdrawn from the system.

The grain germ undergoing treatment, for example, wheat germ or corn germ, may be dried in the extractor before removal by the addition of an air line. The solvent collecting in the still is completely vaporized by the application of additional closed steam, finishing up with live steam. After the solvent has been vaporized and more or less completely passed out of the still, the oil is removed from the still through the withdrawal line. I prefer to operate my process in a closed system in order that the vitamin E in the germ oil may not be subjected to oxidation.

After the withdrawal of the grain germ and the germ oil, the solvent is concentrated in the receiver and the apparatus is ready to receive another charge of grain germ. After extraction, the grain germ, such as the wheat germ or corn germ, is light, dry and of a floury consistency and has been found to have a high mineral, protein, and water-soluble vitamin content. Among other things, it is adapted to be used as a supplement to cereal foods, as a liquid extract containing vitamin B, and may be employed in baking as a supplement to flour. The extracted germ oil is also a valuable product in that it is rich in vitamin E.

It is preferred that the steaming process in the extractor be operated under a substantial sub-atmospheric pressure. The degree of vacuum will vary during the process according to the solvent used, but it is preferred that the vacuum be such that the temperature in the extractor does not exceed 160° F. and does not fall below 125° F. This temperature range is particularly important where the product is to be used as a flour or in connection with baking. The wheat germ contains a proteolytic enzyme presumably protease, which unless destroyed attacks the gluten of the flour and causes hard and unsatisfactory baked products. This enzyme is not destroyed by the extraction temperature even up to temperatures of 170° F., presumably because of the absence of moisture. However, in the presence of steam the enzyme can be destroyed at the lower temperatures designated.

In operating the vacuum extraction the pressure is held at the desired point to give the desired temperature until the temperature starts to rise upon substantial elimination of the solvent. At that point the pressure is lowered and live steam introduced at approximately the same temperature range. This operation is then continued until the product is solvent free.

By the term "solvent free" as used herein it is meant that the product is palatable and shows no trace of solvent as distinguished by taste or odor.

Where it is not desirable to destroy the proteolytic enzyme, temperatures or other conditions may be employed which will preserve the enzyme.

Of course, when a vacuum is employed a vacuum pump is added to the apparatus shown in the drawing.

As is readily seen, my process is a batch operation in a closed system, and has only an imperceptible solvent loss.

While ethylene dichloride is a preferred solvent, any petroleum hydrocarbon solvent boiling below 120° C. and carbon disulfide are suitable for my purpose, if a weak acid is added to the solvent to maintain an acid condition in the extractor. It is important that an acid condition be maintained during the extraction. The foregoing solvents are inflammable and consequently I particularly desire to employ the various chlorine derivatives of ethane such as dichlorolethylene, trichlorol-ethylene, perchlorol-ethylene, tetrachlorol-ethane, and pentachlorol-ethane. These solvents tend to hydrolyze when contacted with the moisture-containing cereal grain germ and it is not necessary to add acid when they are employed. It is apparent that the solvent will be hydrolyzed from the beginning of the extraction until the solvent is drawn off, that is, from the time the solvent contacts the moisture in the grain germ until it is driven off with steam. Excellent results have also been obtained with carbon tetrachloride.

The hydrolysis of such a solvent as ethylene dichloride is of material assistance in removing the last traces of solvent during the steaming operation.

The treated wheat germs are preferably not completely freed from oil but enough of the oil is retained so that the material will not become rancid or unpalatable. Inasmuch as the oil contains some vitamin E and A the retention of it in palatable quantities is desirable.

The above treatment also may be employed to adjust the moisture content of the wheat germ. In all cases the finished product is thoroughly dry and contains less than 10% of moisture, normally about 7%.

In some instances, it has been found desirable to employ the entire grain seed as a charge. In this case, it is desirable to grind the grain seed before it is inserted in the extractor.

The treatment hereinbefore described, when employed with the preferred solvents, and particularly with ethylene di-chloride, extracts the oil from the wheat germ without damaging the vitamin $B_4$ content thereof. This vitamin is found in liver and also in wheat germ and is of great value in the treatment of pernicious anemia. When the oil of the wheat germ is extracted with hexane, ether or acetone, the vitamin $B_4$ is dissolved out and lost, whereas in the present method of procedure the vitamin $B_4$ is retained and the finished dry product is as high as, or higher, in the vitamin than liver.

While I have described in considerable detail the specific form of apparatus which I find well adapted to the carrying out of my process, as well as the details of the particular commercial process in accordance with the invention, it will be understood that this is illustrative only and for the purpose of making clear the nature and mode of applying the invention and that the invention is not to be regarded as limited in scope to the illustrative details given, except insofar as such limitation is included within the terms of the accompanying claims, in which it is my intention to claim all novelty inherent in my invention as broadly as possible in view of the prior art.

This application is a continuation-in-part of my copending application, Serial No. 683,085, filed July 31, 1933.

What I regard as new and desire to secure by Letters Patent is:

1. A finished stable, marketable, non-toxic and palatable dry food product with a high content of vitamin B, consisting of all the constituents of natural grain germ except the oily constituents thereof and with such constituents unimpaired and in the same condition as in the natural germ.

2. The process of making a finished stable, marketable, non-toxic and palatable dry food product, consisting in extracting from natural grain germ all of the oil with a heated solvent therefore at a temperature and acidity to maintain the vitamin B content unimpaired, and subsequently completely removing the solvent from the germ.

3. The method as set forth in claim 2 in which the solvent is removed from the germ under subatmospheric pressure and at a temperature of the order of 125° to 160° F.

4. The method as set forth in claim 2 in which the solvent is ethylene dichloride.

5. The process of making a finished stable, dry, marketable non-toxic and palatable food product consisting of extracting from natural grain germ all of the oil with a heated solvent of the class consisting of chlorine derivatives of the lower molecular weight paraffins and subsequently completely removing the solvent from the germ at a temperature and acidity to maintain the vitamin B and vitamin $B_4$ content unimpaired.

6. The method as set forth in claim 5 in which the removal of solvent is accomplished with the aid of steam, whereby the solvent is partially hydrolyzed.

7. A finished stable, marketable, palatable, dry food product consisting of wheat germ substantially freed from oil and having substantially the vitamin B and vitamin $B_4$ potency of the original germ.

8. The method of treating grain germ to extract therefrom substantially all of the oil which comprises extracting from grain germ substantially all of the oil with a heated hydrolyzing solvent to form an acid under the conditions of the extraction, removing the majority of the solvent by drainage, and removing the last traces of solvent in the presence of heated moisture, wherein the solvent is hydrolyzed to an acid, whereby the entire extraction process is carried out in an acid environment.

9. The method of treating grain germ to extract therefrom substantially all of the oil without affecting its vitamin content, which comprises extracting from grain germ substantially all of the oil with a heated solvent which has hydrolyzed to form an acid, removing the majority of the solvent by drainage, and removing the last traces of solvent in the presence of heated moisture and under a vacuum at a temperature substantially below the boiling point of water, the grain being maintained in an acid condition during the entire extraction process.

10. A food product comprising a finished, stable, marketable, non-toxic, dry, palatable grain germ material, substantially free from the oily constituents of the grain germ and having the remaining constituents thereof in unimpaired form and having substantially the vitamin B potency of the original germ.

11. The method of treating grain germ to extract therefrom substantially all of the oil without affecting the vitamin content which comprises extracting from grain germ substantially all of the oil with a heated solvent under acid conditions and at a temperature above 125° F. and below 160° F., removing the majority of the solvent by drainage, removing the last traces of solvent in the presence of heated moisture at a temperature between 125° F. and 160° F. whereby the protease in the grain is destroyed, the acid conditions being maintained during the entire extraction process.

12. A finished stable, marketable, non-toxic and palatable, substantially protease-free dry food product having a high content of vitamin B, consisting of all of the constituents of natural grain germ except the oily constituents thereof.

13. A flour comprising a finished stable, marketable, palatable, non-toxic, substantially protease-free food product, having a high content of vitamin B, consisting of all of the constituents of natural grain germ except the oily constituents thereof.

14. A food product adapted to be used as a supplement to cereal foods comprising a finished, stable, marketable, non-toxic and palatable, substantially protease free dry food product having a high content of vitamin B consisting of all of the constituents of natural wheat germ except the oily constituents thereof.

15. The process as in claim 2 wherein the natural grain germ undergoing processing is wheat germ.

16. The process as in claim 5, wherein the natural grain germ undergoing processing is wheat germ.

17. The method as in claim 8, wherein the grain germ undergoing treatment is wheat germ.

18. The method as in claim 9, wherein the grain germ undergoing treatment is wheat germ.

19. The method as in claim 11 wherein the grain germ undergoing treatment is wheat germ.

EZRA LEVIN.